United States Patent
Yu et al.

(10) Patent No.: US 7,519,022 B2
(45) Date of Patent: Apr. 14, 2009

(54) SPATIAL MULTIPLEXING DETECTION SYSTEM AND METHOD FOR MIMO

(75) Inventors: Hee-Jung Yu, Daejeon (KR); Hee-Soo Lee, Daejeon (KR); Sok-Kyu Lee, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 751 days.

(21) Appl. No.: 10/853,890

(22) Filed: May 25, 2004

(65) Prior Publication Data

US 2005/0078665 A1 Apr. 14, 2005

(30) Foreign Application Priority Data

Oct. 9, 2003 (KR) .................... 10-2003-0070396

(51) Int. Cl.
*H04W 4/00* (2006.01)
(52) U.S. Cl. ..................................... 370/329
(58) Field of Classification Search .................. None
See application file for complete search history.

(56) References Cited

U.S. PATENT DOCUMENTS

| | | | |
|---|---|---|---|
| 5,515,378 A | 5/1996 | Roy, III et al. | |
| 6,097,771 A | 8/2000 | Foschini | |
| 6,611,231 B2* | 8/2003 | Crilly et al. | 370/310.2 |
| 6,751,187 B2* | 6/2004 | Walton et al. | 370/210 |
| 6,862,271 B2* | 3/2005 | Medvedev et al. | 370/329 |
| 6,928,062 B2* | 8/2005 | Krishnan et al. | 370/329 |
| 7,020,110 B2* | 3/2006 | Walton et al. | 370/334 |
| 7,103,325 B1* | 9/2006 | Jia et al. | 370/329 |
| 7,120,395 B2* | 10/2006 | Tong et al. | 455/101 |
| 2003/0076891 A1* | 4/2003 | Won | 375/267 |
| 2003/0125040 A1* | 7/2003 | Walton et al. | 455/454 |
| 2003/0128658 A1* | 7/2003 | Walton et al. | 370/208 |
| 2004/0062193 A1* | 4/2004 | Ma et al. | 370/208 |
| 2004/0105489 A1* | 6/2004 | Kim et al. | 375/140 |
| 2005/0266902 A1* | 12/2005 | Khatri et al. | 455/575.7 |
| 2006/0121946 A1* | 6/2006 | Walton et al. | 455/561 |
| 2007/0060073 A1* | 3/2007 | Boer et al. | 455/101 |

FOREIGN PATENT DOCUMENTS

WO        WO 03/041300 A1      5/2003

OTHER PUBLICATIONS

IEEE Journal on Selected Areas in Communications, vol. 18, No. 11, Nov. 2000, pp. 2312-2321.

(Continued)

*Primary Examiner*—Anh-Vu H Ly
(74) *Attorney, Agent, or Firm*—Blakely, Sokoloff, Taylor & Zafman LLP

(57) ABSTRACT

A spatial multiplexing detection device using a MIMO technology comprises a MIMO detector for detecting receive symbols which correspond to symbols transmitted through transmit antennas from receive signals when the transmit data transmitted by the terminal group are received through receive antennas; a terminal identifier for identifying the receive symbols detected by the MIMO detector into symbols which correspond to respective terminals in the terminal group; a symbol demapper for demapping the receive symbols identified by the terminal identifier to binary data which correspond to a modulation method used by the terminal group; and a reverse data processor for performing deinterleaving, decoding of error correction codes, and descrambling on the binary data demapped by the symbol demapper, and detecting receive data of the respective terminals.

6 Claims, 7 Drawing Sheets

OTHER PUBLICATIONS

Spatial Multiuser Access with Antenna Diversity using Singular Value Decomposition, pp. 1253-1257.

Blind Adaptive MIMO Decision Feedback Equalization using Givens Rotations, pp. 59-63.

* cited by examiner

SPATIAL MULTIPLEXING DETECTION SYSTEM AND METHOD FOR MIMO

CROSS REFERENCE TO RELATED APPLICATION

This application claims priority to and the benefit of Korea Patent Application No. 2003-70396 filed on Oct. 9, 2003 in the Korean Intellectual Property Office, the content of which is incorporated herein by reference.

BACKGROUND OF THE INVENTION (a) Field of the Invention

The present invention relates to a spatial multiplexing detection system and method by use of a MIMO (Multi Input Multi Output) technology.

(b) Description of the Related Art

The MIMO technology aims at increasing frequency efficiency, and it represents a method for using multiple antennas at a transmitter and a receiver. The MIMO technology concurrently transmits different data through respective antennas of the transmitter, and hence, it increases the frequency efficiency by as much as the number of antennas at the transmitter.

In detection in the MIMO system, multiple data streams are concurrently received and separated. Therefore, the receiver of the MIMO system processes the case in which a single terminal receives multiple data streams and the case in which the data streams are respectively other users' signals in the same way.

The MIMO system uses multiple transmit and receive antennas to improve data rates in a given band, as opposed to the existing SISO system, and an increase of the frequency efficiency depends on the degree of independency among various transmit and receive channels.

Since the independency of MIMO channels follows an interval between antennas, the number of antennas is limited in a terminal, and an increase in the data rates in an uplink is restricted. A base station which is a receiver, however, is not limited to the number of antennas or increase of data rates.

A method for maximizing a channel application in this condition is to allow a number of users that can be detected by the base station to access the channels.

When many users use the channels as described above, if the users are assigned without any rule, the channel capacity may be worsened by channel characteristics such as a correlation between the channels.

To overcome the problems, it is needed for a base station to use the channels of the respective users to assign the users so that the channel capacity may be maximized, and a suboptimal algorithm with substantially less performance deterioration is required for simple realization.

SUMMARY OF THE INVENTION

It is an advantage of the present invention to provide a spatial multiplexing detection system and method using a MIMO technology for applying the MIMO technology to multiplexing for user differentiation, allowing users' concurrent access at the same time, and increasing capacity of a base station.

To achieve the advantage, the present invention discloses a multi-user spatial multiplexing method for an uplink of the MIMO system.

In one aspect of the present invention, provided is a spatial multiplexing detection system using a MIMO technology for allowing a terminal group which is generated by combining terminals concurrently accessible to a base station with multiple antennas therein, for transmitting transmit data to the base station, wherein the base station comprises:

a MIMO detector for detecting receive symbols, which correspond to symbols transmitted through transmit antennas from receive signals, when the transmit data transmitted by the terminal group are received through receive antennas;

a terminal identifier for identifying the receive symbols detected by the MIMO detector as symbols which correspond to respective terminals in the terminal group;

a symbol demapper for demapping the receive symbols identified by the terminal identifier to binary data which correspond to a modulation method used by the terminal group; and a reverse data processor for performing deinterleaving, decoding of error correction codes, and descrambling on the binary data demapped by the symbol demapper, and detecting receive data of the respective terminals.

The symbol demapper and the reverse data processor are provided as the same number as that of the terminals in the terminal group.

The terminal of the terminal group comprises:

a data processor for performing scrambling, error correction encoding, and interleaving on the transmit data, and processing them as binary data;

a symbol mapper for mapping the binary data transmitted by the data processor according to a desired modulation method; and a parallel converter for paralleling the symbols mapped by the symbol mapper to the respective antennas, and providing them by consideration of the number of the transmit antennas.

In another aspect of the present invention, a spatial multiplexing detection method using a MIMO technology comprises:

(A) searching for an optimal group allocation method of all terminals by using channel information of a first terminal and a second terminal when the second terminal is accessed to a base station while the base station with multiple antennas built therein communicates data with the first terminal;

(B) allocating the terminals to corresponding time slots and transmitting data according to the optimal group allocation method; and (C) sensing serious degrees of variation of data transmission channels, determining whether to modify the group allocation method of the terminals according to the sensed serious degrees of the channel variation, and notifying the corresponding terminal of the determination.

The step of (A) comprises:

(a) estimating a channel of the second terminal, and identifying the group allocation methods of all the terminals;

(b) calculating channel capacities of the respective group allocation methods identified in (a); and (c) selecting the group allocation method having the maximum channel capacity from among the channel capacities calculated in (b).

The step of calculating channel capacities in (b) comprises: calculating the theoretic channel capacities using singular values of a channel matrix regarding the estimated channel using Equation 3.

The step of calculating channel capacities in (b) comprises: finding the channel capacities by using a norm of a nulling vector $w_i$ for detecting the transmit symbol using Equation 7 when the base station performs a type of V-BLAST (Vertical Bell Labs Layered Space Time) detection.

The partial channel capacity of a first layer using the norm of the nulling vector used for detecting the first layer of the V-BLAST method is found.

The step of (c) comprises selecting the optimal group allocation method for maximizing the channel capacity of the terminal which has the maximum channel capacity calculated in (b).

The step of allocating the terminals to corresponding time slots in (B) comprises: configuring a set which includes less than a predetermined number of the terminals, allocating the terminals in the configured set, and differentiating the time slots between the sets, when a large number of terminals are provided in the base station.

BRIEF DESCRIPTION OF THE DRAWINGS

The accompanying drawings, which are incorporated in and constitute a part of the specification, illustrate an embodiment of the invention, and, together with the description, serve to explain the principles of the invention.

DETAILED DESCRIPTION OF THE PREFERRED EMBODIMENTS

In the following detailed description, only the preferred embodiment of the invention has been shown and described, simply by way of illustration of the best mode contemplated by the inventor(s) of carrying out the invention. As will be realized, the invention is capable of modification in various obvious respects, all without departing from the invention. Accordingly, the drawings and description are to be regarded as illustrative in nature, and not restrictive.

Figure 1:
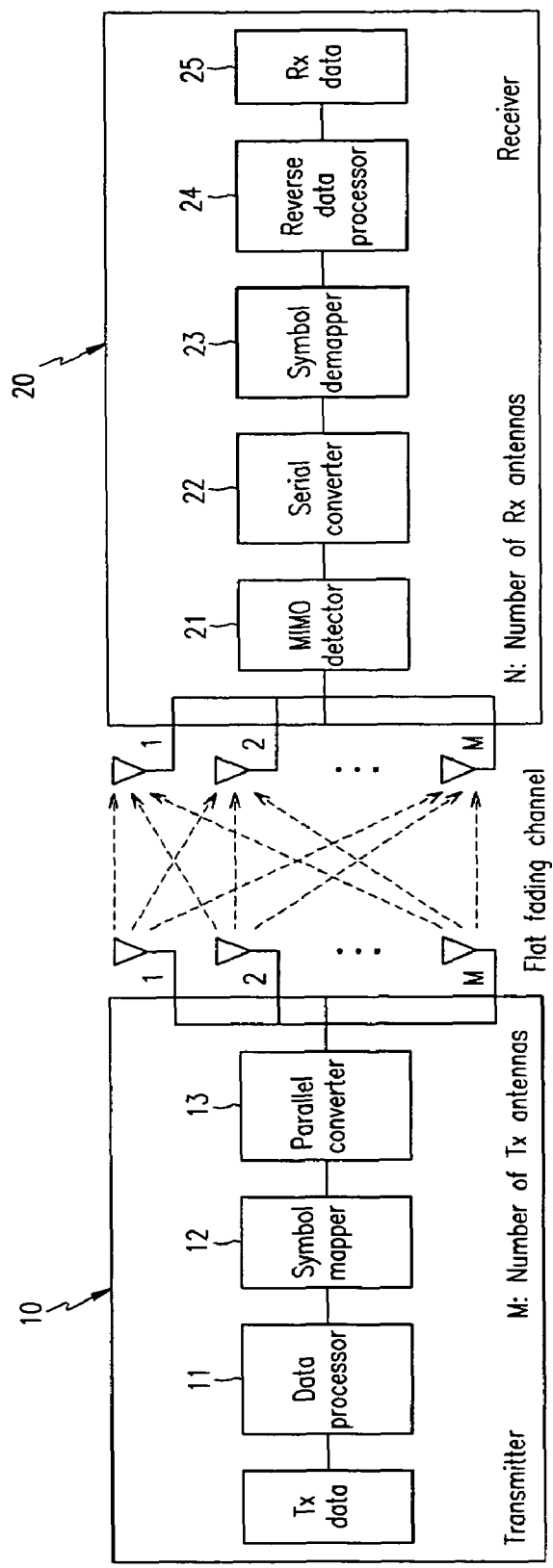
FIG. 1 shows a configuration of a transmitter and receiver of a MIMO system according to a preferred embodiment of the present invention.

FIG. 1 shows a configuration of a transmitter and receiver of a MIMO system according to a preferred embodiment of the present invention.

As shown, the transmitter and receiver of a MIMO system comprises a transmitter 10 using M transmit antennas, and a receiver 20 using N receive antennas.

Transmit data from the transmitter 10 are passed through a data processor 11, a symbol mapper 12, and a parallel converter 13, and they are transmitted as transmit symbol vectors to the receiver 20 through the transmit antennas.

When the transmit symbol vectors are transmitted as receive symbol vectors to the receive antennas, the receive symbol vectors are sequentially passed through a MIMO detector 21 for detecting data by using a MIMO detection method, a serial converter 22, a symbol demapper 23, and a reverse data processor 24, and are detected as receive data.

As to the receive signals at the receiver 20, when (M×1) transmit symbol vectors d(n) are transmitted through transmit antennas and (N×1) receive symbol vectors y(n) are received from the receive antennas, the receive signals are given as Equation 1.

$$y(n) = H(n)d(n) + u(n)$$
$$d(n) = [d_1(n), d_2(n), \ldots, d_M(n)]^T$$
$$y(n) = [y_1(n), y_2(n), \ldots, y_N(n)]^T$$
$$u(n) = [u_1(n), u_2(n), \ldots, u_N(n)]^T \quad \text{Equation 1}$$

As given, the receive signals are passed through an (N×M) channel matrix H(n) formed by flat fading channel gains between the respective transmit and receive antennas, and a noise vector u(n) is added thereto.

The MIMO method uses the receive signals y(n) and restores the transmit signals d(n). Channel capacity C of the MIMO system is given in Equation 2.

$$C = \log_2 \det\left(I + \frac{SNR}{M} HH^H\right) \quad \text{Equation 2}$$

where I is an (N×N) identical matrix, SNR is a signal-to-noise ratio at the receiver, and the superscript H is a conjugate transpose calculation of a complex matrix. Equation 2 can be given as Equation 3.

$$C = \sum_{i=1}^{K} \log_2\left(1 + \frac{SNR}{M} \sigma_i^2\right) \quad \text{Equation 3}$$

where K is a rank of the channel matrix H, $\sigma_i$, i=1, ..., K is singular values of the channel matrix, and M is the number of transmit antennas.

As can be know from Equation 3, factors for determining the channel capacity include a rank of the channel matrix and a size of the singular value. The channel capacity is varied according to channel states even though the number of the transmit antennas and the receive antennas correspond to each other.

The methods for detecting the MIMO system include the maximum likelihood detection method, the linear detection method, and the V-BLAST (Vertical Bell Labs Layered Space Time) method, and the most reasonable method is the V-BLAST method when considering performance and complexity of realization.

Regarding an operation of the V-BLAST method, a transmit symbol having the least norm of the nulling vector $w_i$, that is, the least error probability, is detected at first among the M transmit data.

The detected result and channel are used to cancel an influence from the receive signal, the column component which corresponds to the detected transmit data is canceled in the channel matrix, and the above-described detection process is repeatedly performed with the generated channel matrix until the transmitted symbols are detected.

The channel capacity as expressed in Equation 3 is obtained by using the SVD (Singular Value Decomposition) for the MIMO detection method. The MIMO channel is modeled as K independent channels by the SVD, and an equivalent channel gain of each channel is given as $\sigma_i$. Hence, the channel capacity is given as capacity summation of the respective K flat fading channels.

An inverse $$(1/\|w_i\|)$$

of the nulling vector used for the detection process can be used as an equivalent channel gain in the case of using the V-BLAST method as the detection method. When the ZF (Zero Forcing) method is used for a reference of determining the nulling vector, the nulling vector has a relation as given in Equation 4.

$$w_i^T(H)_k = \delta_{ik} = \begin{cases} 1, & i = k \\ 0, & i \neq k \end{cases} \quad \text{Equation 4}$$

where $(H)_k$ is the $k^{th}$ column of the channel matrix. Accordingly, the decision statistic value corresponding to the $i^{th}$ transmit symbol is given as Equation 5.

$$z_i = d_i + w_i^T u, \; i=1, \ldots, M \quad \text{Equation 5}$$

That is, since the power of noise is increased in the outputs of an equalizer by $\|w_i\|^2$, the equivalent channel gain can be given as $$1/\|w_i\|.$$

Hence, the summation of $\|w_i\|$, $i=1, \ldots, M$ is to be minimized in order to obtain the optimized performance in the MIMO system having the V-BLAST receiver.

The above-noted MIMO technology is to increase the channel capacity and transmit many data with a given bandwidth and during a given time, and it is mainly studied for one by one links between a single terminal and a base station.

However, since the terminal has spatial restrictions, its channel capacity is limited because of large correlations between the antennas even when many antennas are installed, but the base station has very few restrictions on the channel capacity.

By considering the conditions, a method for a plurality of terminals to perform access in an instant is disclosed since the receiver can separate the respective users by using the MIMO detection method.

In order to apply the V-BLAST detection method, the summation of the number of antennas accessed by the terminal at the same time is to be less than or equal to the number of antennas of the base station.

Figure 2:
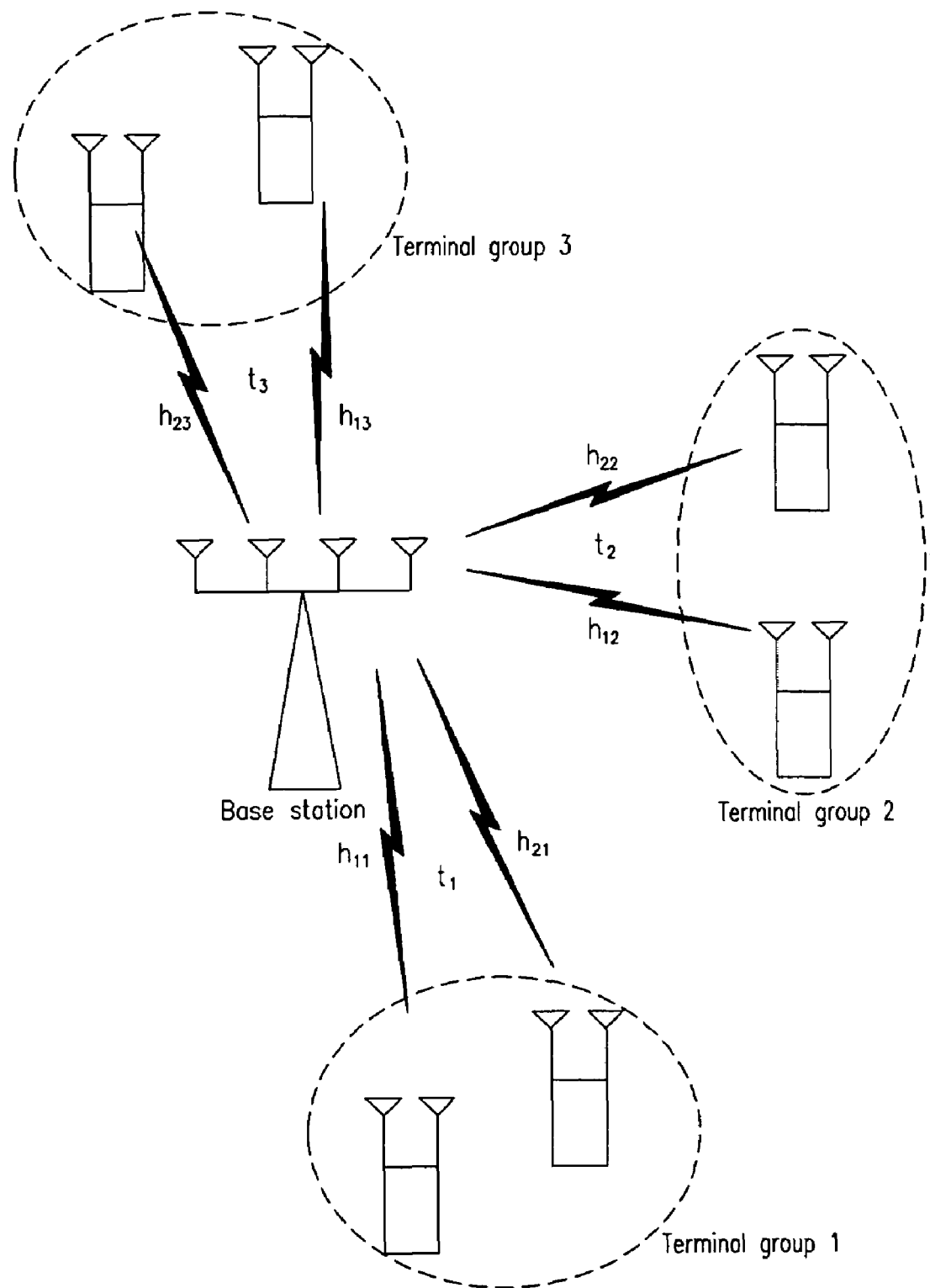
FIG. 2 shows an exemplified multi-user spatial multiplexing structure in a MIMO system.

FIG. 2 shows an exemplified multi-user spatial multiplexing structure in a MIMO system.

As shown, when the base station has four antennas and each terminal has two antennas, two terminals can use the channel at the same time, and when the two terminals are grouped as a single terminal group, a total of three terminal groups can access the base station at each different time.

The MIMO system of the multi-user spatial multiplexing format further increases the channel capacity compared to the case in which six terminals use different times respectively in the conventional TDMA (Time Division Multiple Access).

Figure 3:
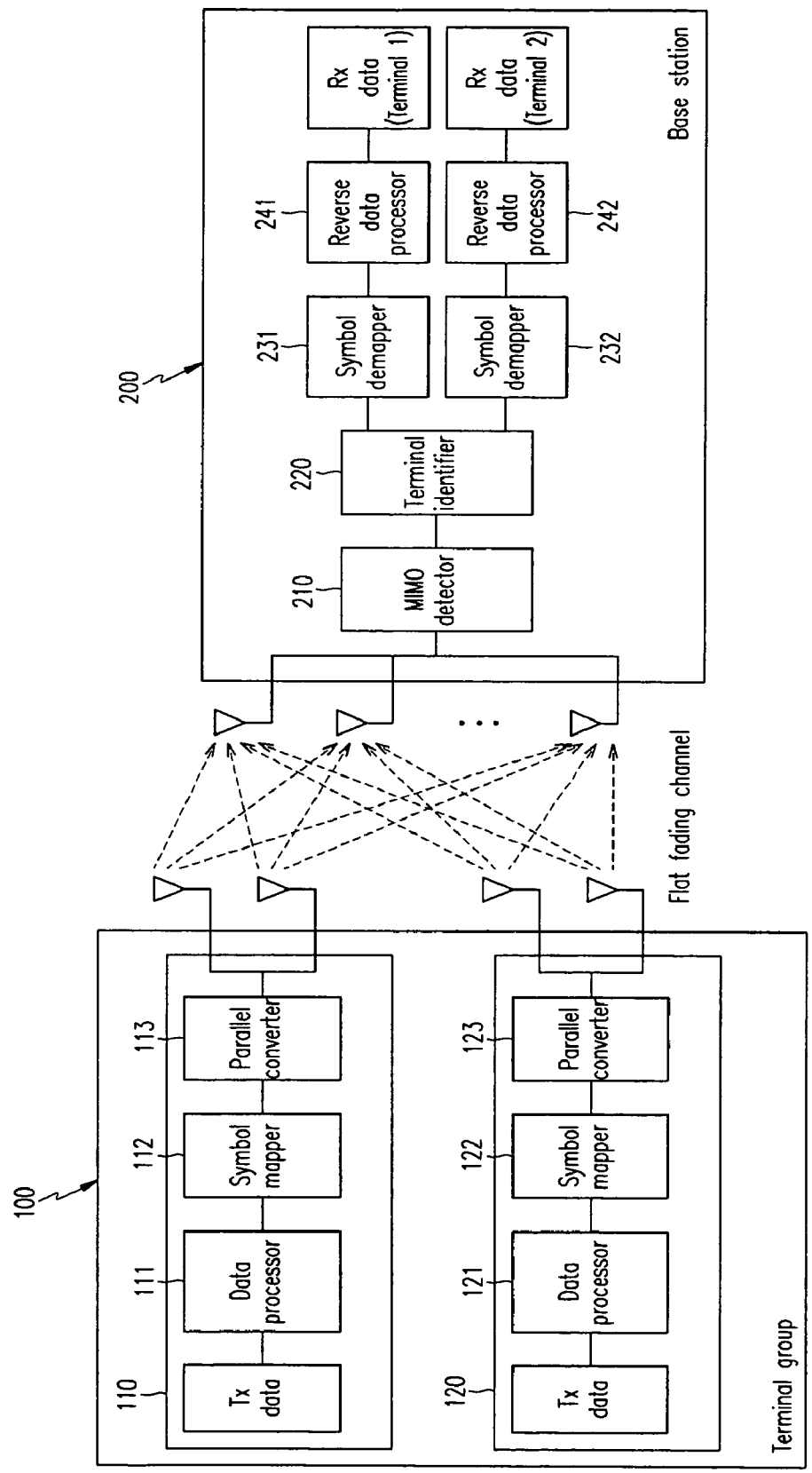
FIG. 3 shows a configuration of a spatial multiplexing detection system using a MIMO system according to a preferred embodiment of the present invention.

FIG. 3 shows a configuration of a spatial multiplexing detection system using a MIMO system according to a preferred embodiment of the present invention.

As shown in the spatial multiplexing detection system using a MIMO system, a base station 200 comprises a MIMO detector 210, a terminal identifier 220, symbol demappers 231 and 232, and reverse data processors 241 and 242, when a terminal group 100 includes two terminals.

First and second terminals 110 and 120 in the terminal group 100 respectively comprise data processors 111 and 121, symbol mappers 112 and 122, and parallel converters 113 and 123.

The data processors 111 and 121 perform scrambling, error correction coding, and interleaving on the transmit data to process them as binary data. In this instance, the transmit data represent data transmitted from the first and second terminals 110 and 120, and they are transmitted to a physical layer from a MAC (Medium Access Control) layer.

The symbol mappers 112 and 122 map the binary data transmitted by the data processors 111 and 121 according to a desired modulation method, and the parallel converters 113 and 123 provide the mapped transmit symbols in parallel with the respective antennas in consideration of the number of transmit antennas. The transmit antennas transmit the transmit symbols paralleled by the parallel converters 113 and 123 to the radio environment. The data transmitted through the transmit antennas are passed through a flat fading channel, and are provided to the base station 200 through the receive antennas.

The MIMO detector 210 detects the receive symbols that correspond to the symbols transmitted by the respective transmit antennas from among the signals received from the receive antennas by generally using the V-BLAST method.

The terminal identifier 220 identifies the receive symbols detected by the MIMO detector 210 in symbol groups which correspond to respective terminals, and the symbol demappers 231 and 232 perform the opposite process of the symbol mappers 112 and 122 of the respective terminals, and demap the receive symbols to the corresponding binary data.

The reverse data processors 241 and 242 perform the opposite process of the data processors 111 and 121 of the respective terminals, and in detail, perform descrambling, decoding of the error correction codes, and interleaving in the opposite sequence of the data processors 111 and 121.

The receive data of the respective terminal, detected through the reverse data processors 241 and 242, represent information to be transmitted to the MAC layer.

In this instance, the symbol demappers 231 and 232 and the reverse data processors 241 and 242 are provided as the same number as there are terminals in the terminal group 100, and it is desirable to install them in pairs since the two terminals are grouped into a single terminal group as shown in FIG. 3.

When the terminals are grouped as a predetermined number of terminals into terminal groups, optimal grouping can be executed by considering the channel capacity.

For example, when the base station 200 has channel information on the respective antennas of the six terminals, the largest summation of the channel capacities of all the terminals can be selected from among fifteen different group allocation methods. The group allocation methods are provided according to how the channel capacity is defined.

The first method is to use characteristics of the channel capacity given as Equation 3. Referring to FIG. 2, the channel of the three terminal groups is given as Equation 6.

$$H_1 = \begin{bmatrix} h_{11} \\ h_{21} \end{bmatrix}, H_2 = \begin{bmatrix} h_{12} \\ h_{22} \end{bmatrix}, H_3 = \begin{bmatrix} h_{13} \\ h_{23} \end{bmatrix} \quad \text{Equation 6}$$

The optimal group allocation is performed by finding the respective singular values on the three channels, calculating the channel capacity, and selecting a combination which maximizes the channel capacity.

Figure 4:
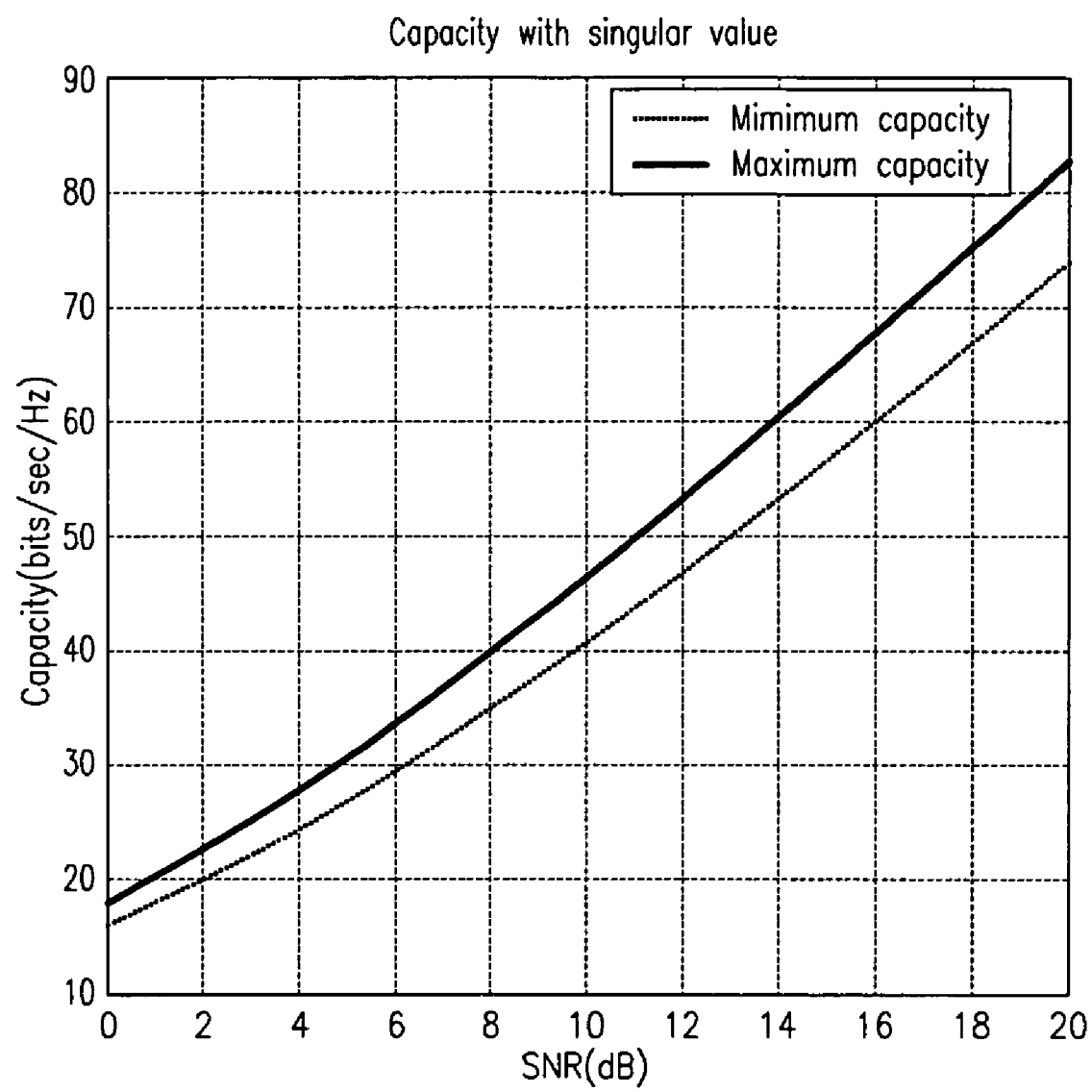
FIG. 4 shows a graph of optimal grouping and worst grouping according to summation of channel capacity in an allocation method of terminal groups using a singular value of a channel matrix.

FIG. 4 shows a graph of optimal grouping and worst grouping according to summation of channel capacity in an allocation method of terminal groups using a singular value of a channel matrix.

When the channel is given as a complex Gaussian random variable with the mean of 0, and the variance of 1 is given, the summation of the channel capacities on the fifteen combinations in the channel matrix generated in the probabilistic manner is given as FIG. 4.

As shown, the difference of the channel capacities between the optimal combination and the worst combination is given as about 7 bits/sec/Hz at the SNR of 10 dB.

When the base station 200 performs a V-BLAST type detection, the channel capacity is calculated as given in Equation 7 by using the norm of the nulling vector for detecting the transmit symbols.

$$C = \sum_{i=1}^{M} \log_2\left(1 + \frac{SNR}{M \cdot \|w_i\|^2}\right) \quad \text{Equation 7}$$

Compared to the channel capacity which uses the singular value of the above-noted channel matrix, the channel capacity calculation using the nulling vector by Equation 7 is more effective because the operation of finding the nulling vector is also used by the detection process, but the process of finding the singular value of the channel matrix is an additional operation process.

Figure 5:
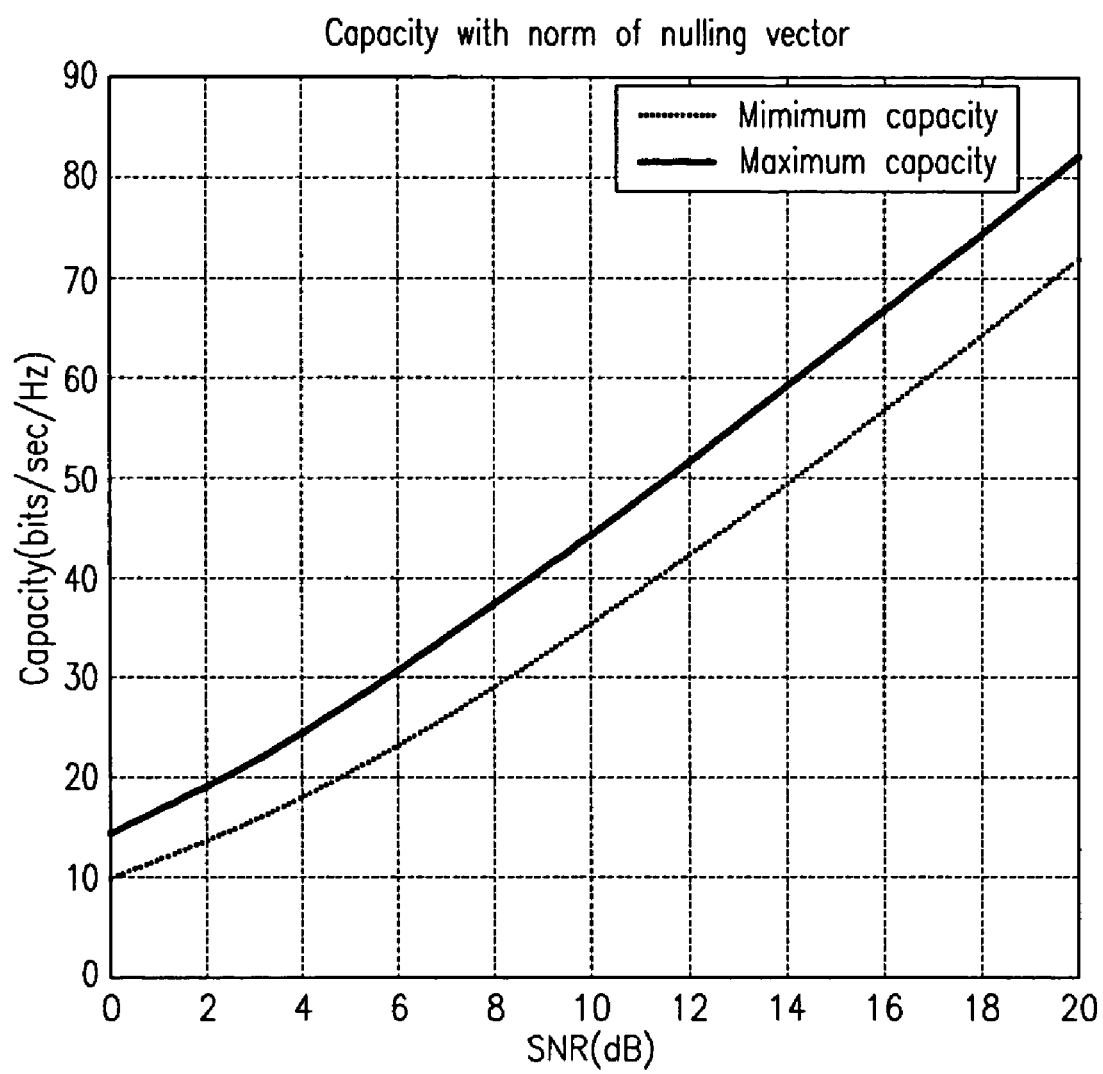
FIG. 5 shows a graph of optimal grouping and worst grouping according to summation of channel capacity in an allocation method of terminal groups using a nulling vector when a base station uses the V-BLAST-type detection method.

FIG. 5 shows a graph of optimal grouping and worst grouping according to the summation of the channel capacities in an allocation method of the terminal groups using a nulling vector when a base station uses the V-BLAST type detection method.

The summation of the channel capacities of the terminals by Equation 3 using the nulling vector is given as FIG. 5.

Figure 6:
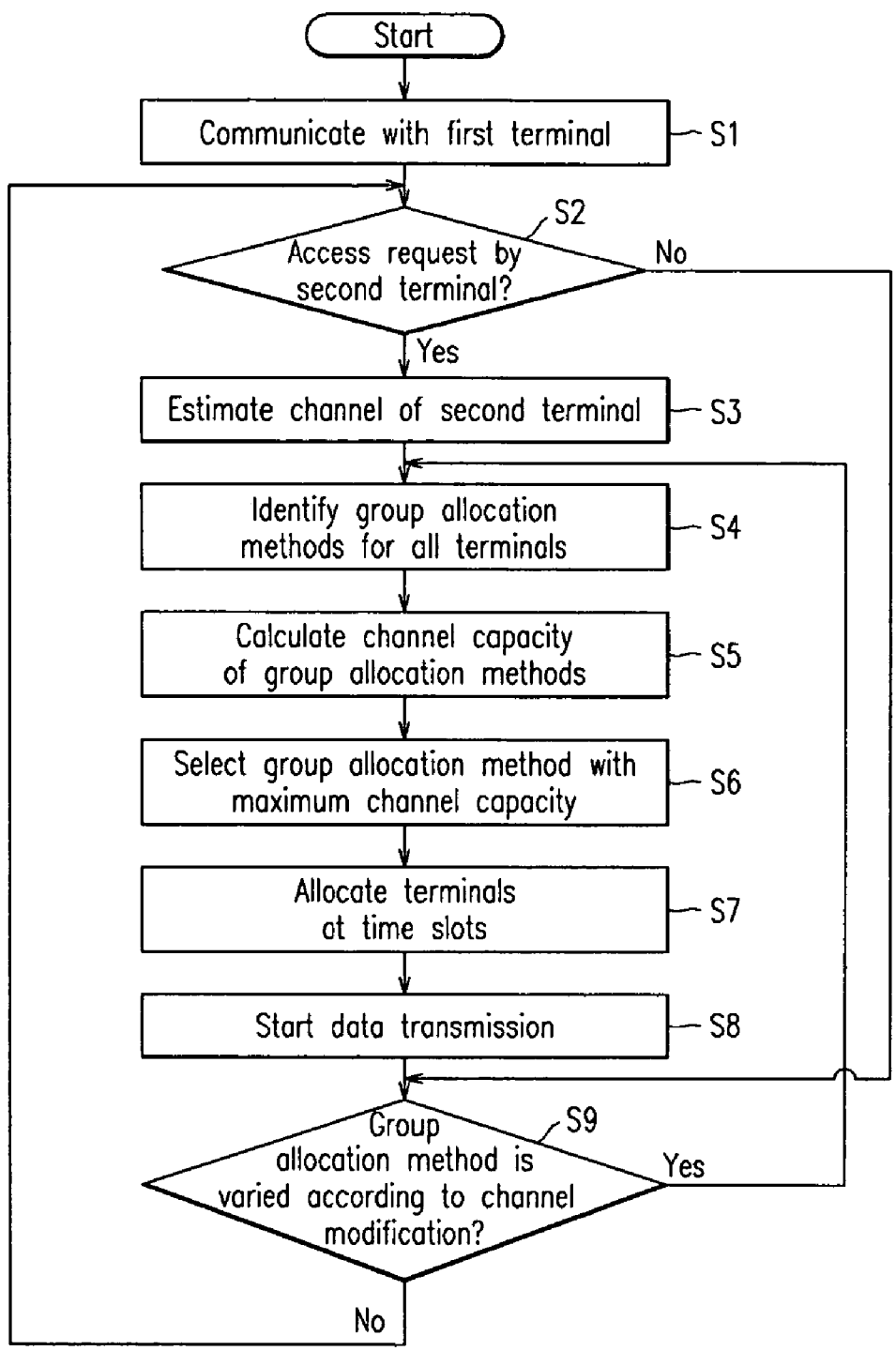
FIG. 6 shows a flowchart for a spatial multiplexing detection method using a MIMO technology according to a preferred embodiment of the present invention.

FIG. 6 shows a flowchart for a spatial multiplexing detection method using a MIMO technology according to a preferred embodiment of the present invention.

As shown in the spatial multiplexing detection method using a MIMO of FIG. 6, when the second terminal requests an access while the base station 200 transmits data during communicating with a first terminal in step S1 and S2, channels of the first and second terminals are estimated in step S3.

The base station 200 identifies group allocation methods for all the terminals in step S4, and uses the singular value of the channel matrix or the nulling vector to calculate the channel capacities of the respective group allocation methods in step S5.

The base station 200 selects a group allocation method having the maximum channel capacity in step S6, and allocates the terminals at appropriate time slots according to the group allocation method in step S7.

The base station 200 continues communication until determining to modify the group allocation method by the grouped terminal group and the channel variation in step S8.

When the channel is severely varied, the base station 200 determines to modify the group allocation method of the terminal, goes to the previous step of S4, uses the current channel information to allocate a group, and notifies the terminal of the allocation in step S9.

By undergoing the communication and the group allocation process, the terminals and the base stations 200 continue communication.

Reduction of the number of the terminals allocated to a single terminal group allows simpler optimal group allocation, when the base station groups the terminals. For example, when the number of terminals accessed to a base station is defined to be eighteen, the terminals are separated into three groups each having six terminals, and the optimal group allocation is performed through thrice executing the group allocation algorithm with the six terminals.

In general, since the magnitudes of norms of all nulling vectors depend on the magnitude of nulling vector norm corresponding to the first layer, the terminal groups are allocated by using the nulling vector of the first layer.

That is, when the nulling vector norm of the first layer is small, the norm of a nulling vector of another subsequent layer also tends to be small, and accordingly, the total channel capacity is increased, and when the nulling vector norm of the first layer is large, the channel capacity tends to be small.

Figure 7:
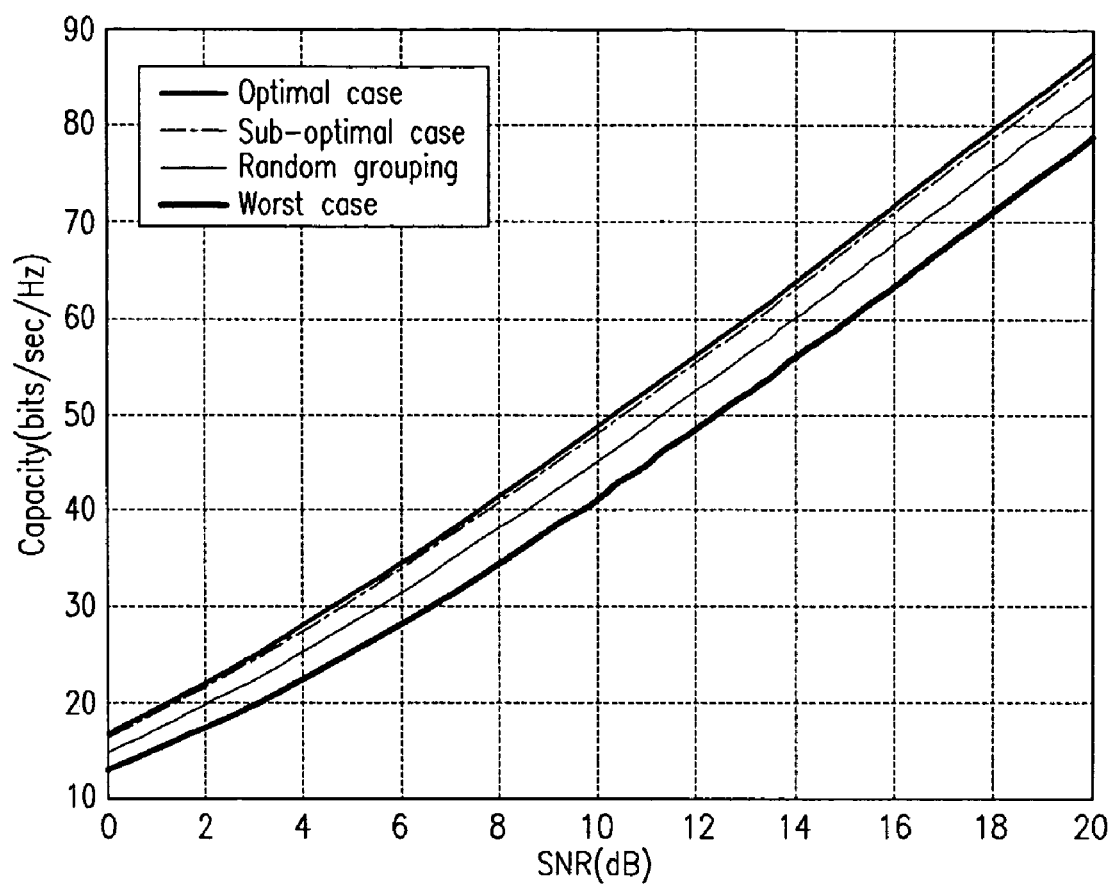
FIG. 7 shows a graph of grouping when a base station uses the V-BLAST-type detection method and sub optimal allocation of terminal groups with a nulling vector of a first layer.

FIG. 7 shows a graph of grouping when a base station uses the V-BLAST type detection method and sub-optimal allocation of terminal groups with a nulling vector of a first layer.

That is, FIG. 7 shows comparison results of performance of the sub-optimal group allocation method using the nulling vector of the first layer and the performance of the group allocation method using all the nulling vectors, and the performance of the sub-optimal case is very much less degraded compared to the optimal group allocation method.

FIG. 7 shows simulation results on the assumption that the six terminals respectively have two antennas and the base station has four antennas, showing channels probabilistically generated 1000 times and the average of the channel capacities in the 1000 channel states.

It is possible for all the terminals to generate fair performance by using the group allocation method for maximizing the capacity of the terminal which has the minimum channel capacity, in addition to the method of allocating the groups so that the summation of the channel capacities of the terminals within all the terminal groups.

When the spatial multiplexing detection system and method using a MIMO technology is combined with the OFDM (Orthogonal Frequency Division Multiplexing) method, and is applied for each subcarrier, results which are very similar to the above description are obtained.

While this invention has been described in connection with what is presently considered to be the most practical and preferred embodiment, it is to be understood that the invention is not limited to the disclosed embodiments, but, on the contrary, is intended to cover various modifications and equivalent arrangements included within the spirit and scope of the appended claims.

As described, the spatial multiplexing detection system and method using a MIMO technology uses the MIMO technology to identification of users using the spatial multiplexing to thereby improve the total system capacity, and uses channel information to group the concurrently accessing terminals into terminal groups to thereby further improve the channel capacity when a base station performs optimal terminal allocation.

What is claimed is:

1. A spatial multiplexing detection system using a MIMO (Multi Input Multi Output) technology for allowing a terminal group which is generated by combining terminals concurrently accessible to a base station with multiple antennas therein, for transmitting transmit data to the base station, comprising:
- a MIMO detector for detecting receive symbols which correspond to symbols transmitted through transmit antennas from receive signals when the transmit data transmitted by the terminal group are received through receive antennas, wherein the terminal group includes first and second terminals, wherein the second terminal is accessed by the base station when the base station communicates with the first terminal and said MIMO detector includes a channel estimator for the second terminal and identifies the group allocations of all terminals;
- a channel capacity calculator for calculating a channel capacity for a respective group allocation identified by the MIMO detector;
- a selector for selecting a group allocation having a maximum channel capacity from among the channel capacities calculated by the channel capacity calculator;
- a terminal identifier for identifying the receive symbols detected by the MIMO detector as symbols which correspond to respective terminals in the terminal group;
- a symbol demapper for demapping the receive symbols identified by the terminal identifier to binary data which correspond to a modulation method used by the terminal group; and
- a reverse data processor for performing deinterleaving, decoding of error correction codes, and descrambling on the binary data demapped by the symbol demapper, and detecting receive data of the respective terminals.

2. The spatial multiplexing detection system of claim 1, wherein the symbol demapper and the reverse data processor are provided in the same number as that of the terminals in the terminal group.

3. The spatial multiplexing detection system of claim 1, wherein each of the terminals of the terminal group comprises:
- a data processor for performing scrambling, error correction encoding, and interleaving on the transmit data, and processing them as binary data;
- a symbol mapper for mapping the binary data transmitted by the data processor according to a desired modulation method; and
- a parallel converter for paralleling the symbols mapped by the symbol mapper to the respective antennas, and providing them by consideration of the number of the transmit antennas.

4. A spatial multiplexing detection method using a MIMO (Multi Input Multi Output) technology, comprising:
- (A) searching for an optimal group allocation of all terminals by using channel information of a first terminal and a second terminal when the second terminal is accessed to a base station while the base station with multiple antennas built therein communicates data with the first terminal, wherein the step (A) comprises:
    - (a) estimating a channel of the second terminal, and identifying the group allocations of all terminals;
    - (b) calculating channel capacities of a respective group allocation identified in (a); and
    - (c) selecting a group allocation having a maximum channel capacity from among the channel capacities calculated in (b);
- (B) allocating the terminals to corresponding time slots and transmitting data according to the optimal group allocation; and
- (C) sensing serious degrees of variation of data transmission channels, determining whether to modify the group allocation of the terminals according to the sensed serious degrees of variation, and notifying a corresponding terminal of the determination.

5. The spatial multiplexing detection method of claim 4, wherein the step of (c) comprises selecting the optimal group allocation for maximizing the channel capacity of a terminal which has the maximum channel capacity calculated in said calculating channel capacities.

6. The spatial multiplexing detection method of claim 4, wherein the step of allocating the terminal to corresponding time slots in (B) comprises:
- configuring a set which includes less than a predetermined number of the terminals,
- allocating the terminals to the configured set, and
- differentiating the time slots between the sets, when a large number of terminals are provided in the base station.

* * * * *